UNITED STATES PATENT OFFICE.

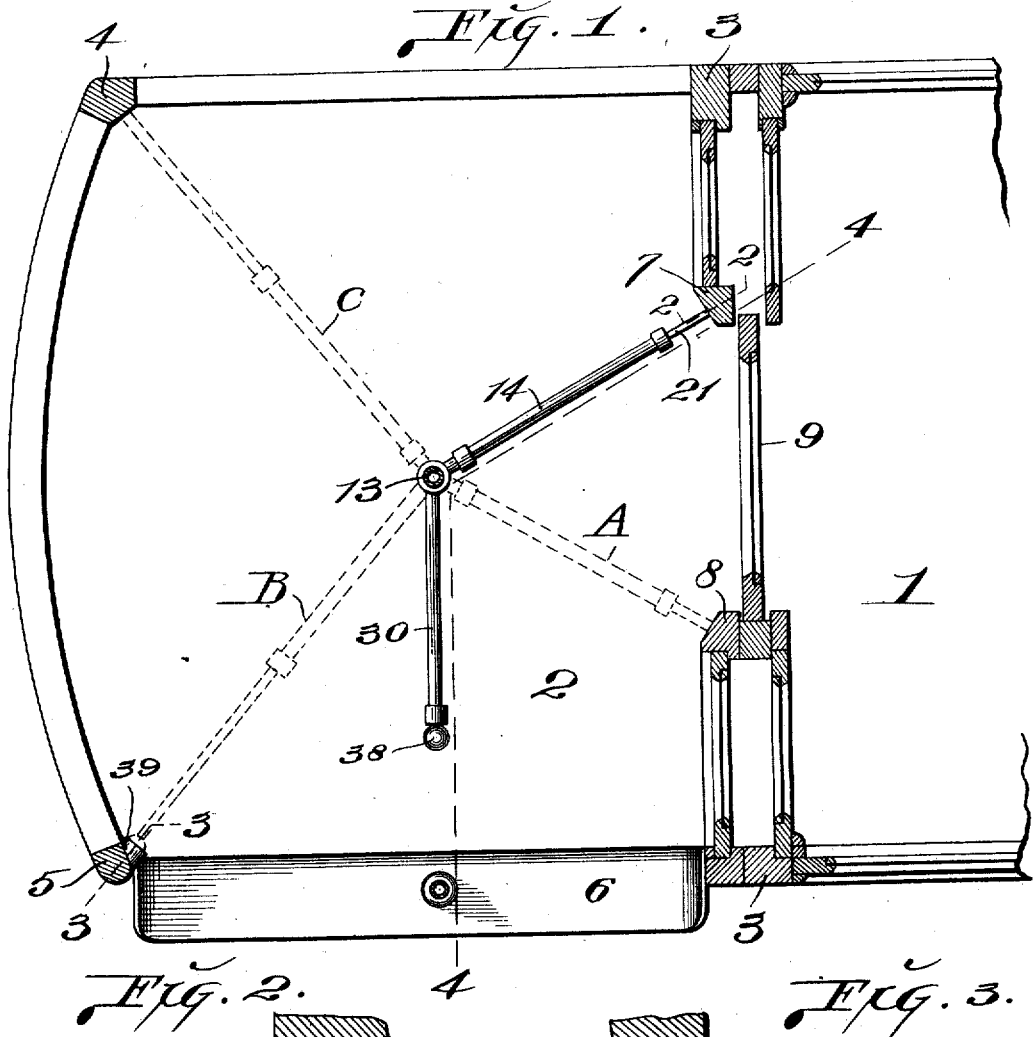

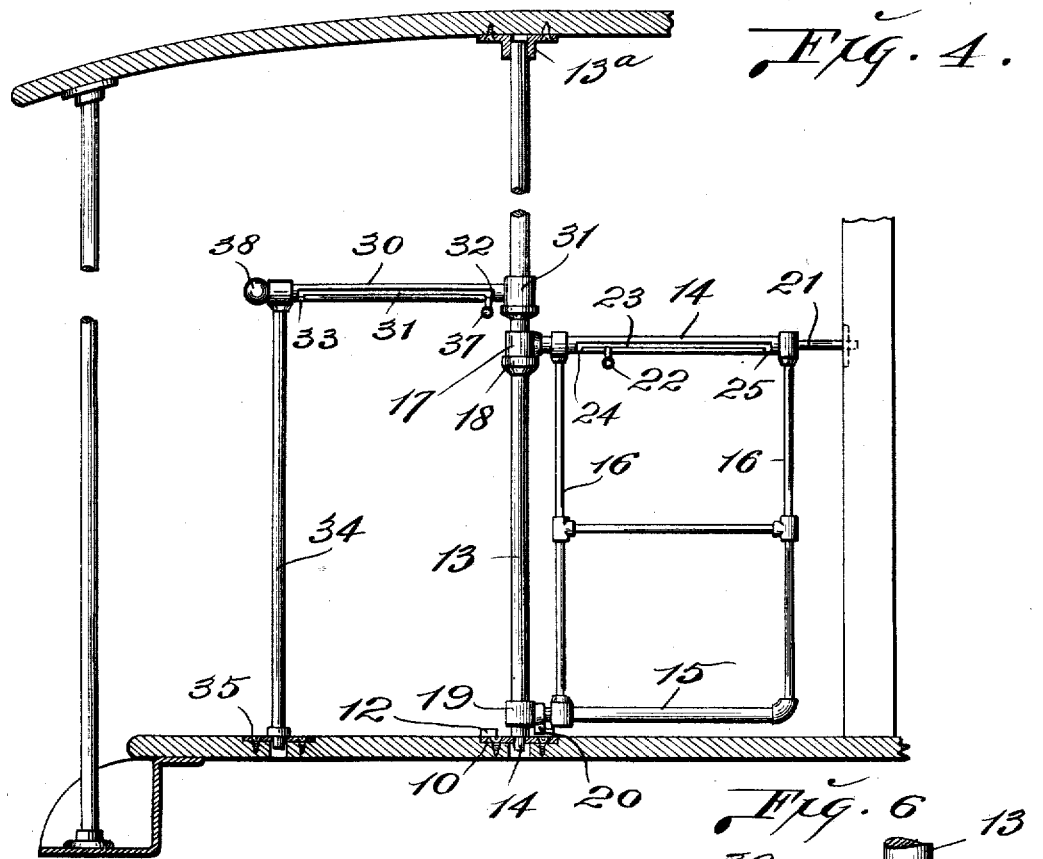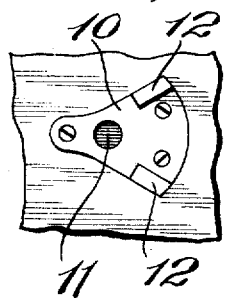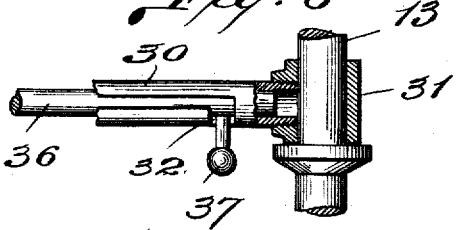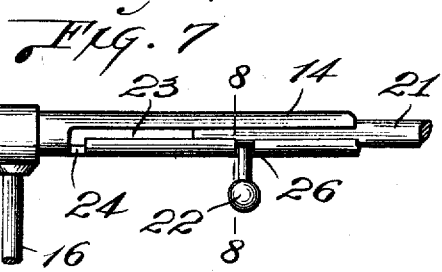

CHARLES O. BIRNEY, OF ST. LOUIS, MISSOURI.

STREET-CAR.

No. 912,792.   Specification of Letters Patent.   Patented Feb. 16, 1909.

Application filed April 2, 1908. Serial No. 424,851.

*To all whom it may concern:*

Be it known that I, CHARLES O. BIRNEY, a citizen of the United States, and resident of St. Louis, Missouri, have invented certain new and useful Improvements in Street-Cars, of which the following is a specification containing a full, clear, and exact description, reference being had to the accompanying drawings, forming a part hereof.

My invention relates generally to street cars, and more particularly to the car platform and entrance, my object being to construct a car and platform embodying what is commonly known as the pay-on-platform principle, whereby all of the passengers entering the car pass by the conductor stationed on the platform adjacent the car door, and there being a swinging gate or barrier operated by the conductor for the purpose of preventing crowding and consequent confusion of the in-coming and out-going passengers at the car door and upon the car platform.

A further object of my invention is to equip the platform of a car with means whereby the pay-on-platform principle is carried out in connection with a car having but a single door opening between the platform and car body, and which means can be readily shifted so as to cut off a portion of the car platform when the same is occupied by the motorman or car driver.

To the above purposes, my invention consists in certain novel features of construction and arrangement of parts, which will be hereinafter more fully set forth, pointed out in the claims, and illustrated in the accompanying drawings, in which:

Figure 1 is a horizontal section taken through the center of one end of a car body and platform constructed in accordance with my invention; Fig. 2 is an enlarged detail section taken on the line 2—2 of Fig. 1; Fig. 3 is an enlarged detail section taken on the line 3—3 of Fig. 1; Fig. 4 is a section taken approximately on the line 4—4 of Fig. 1; Fig. 5 is a plan view of a bearing plate located on the car platform; Fig. 6 is an enlarged detail section showing the connection between a rail and the main post or stanchion located on the center of the car platform; Fig. 7 is an elevation of the connection between the top rail of the gate or barrier and the stanchion; and Fig. 8 is a cross section taken on the line 8—8 of Fig. 7.

Referring by numerals to the accompanying drawings: 1 designates the car body, 2 the platform thereof, 3 the corner posts of the car, 4 and 5 the vestibule posts, 6 the step at one side of the platform, 7 and 8 the door posts at the end of the car body, and 9 the car door which slides laterally in the usual manner to open the doorway between the said posts 7 and 8.

Arranged on the car platform, directly in front of the center of the door opening is a plate 10, in which is formed an aperture 11, and formed integral with the top of said plate is a pair of stop lugs 12. A post or stanchion 13 is provided on its lower end with a pin 14, which bears in the aperture 11, and the upper end of said post or stanchion bears in a socket 13ª, fixed to the under side of the hood over the car platform.

A gate or barrier is arranged to swing on the stanchion 13, which gate or barrier comprises a top rail 14, bottom rail 15, and said rails being connected by the vertical rods 16. The upper rail 14 is in the form of a tube, and on its inner end is fixed a collar 17, which is loosely fitted on the stanchion 13 immediately above a fixed collar 18. The inner end of the rail 15 is provided with a collar 19, which is loosely arranged on the lower end of the stanchion 13, and formed integral with this collar 19 is an outwardly pending lug 20, which engages against the stop lugs 12 when the gate or barrier is swung from one position to another.

Arranged to slide through the tubular rail 14 is a rod 21, which is manipulated by means of a handle 22, which latter projects through a slot 23 formed in the rail 14, and there being notches 24 and 25 formed at the ends of said slot, and there being a notch 26 formed in said rail adjacent the notch 24. The outer end of the rod 21 is adapted to enter recesses, such as 27, formed in the outer faces of the posts 7 and 8, and over which recesses are positioned plates 28, provided with apertures 29.

30 designates a tubular rail, which is provided at one end with a collar 31, which is loosely mounted on the stanchion 13 immediately above the end of the rail 14, and formed in said rail 30 is a longitudinally extending slot 31, provided at its ends with notches 32 and 33. Fixed to the outer end of this rail is the upper end of a vertically disposed rod 34, the lower end of which is seated in a plate 35 arranged in the car platform adjacent the step 6, and approximately half way between the end of the car body and the front of the car platform.

Arranged to slide in the tubular rail is a rod 36, which is manipulated by means of a handle 37, which operates through the slot 31, and fixed on the outer end of this rod 36 is a ball 38. Seated in the rear face of the vestibule post 5 is a socket 39, which is adapted to receive the ball 38 when the rod 36 is moved to its outer limit of movement through the rail 30.

One of the socket plates 28 is seated in the inner face of the post 4 in position to receive the outer end of the rod 21 when the same is moved outward.

When a car of my improved construction is in use, the passengers entering the car pass onto the rear portion of the car platform and deliver their fare to the conductor, who is stationed immediately in front of the post or stanchion 13, and upon receiving the passenger's fare, the conductor engages the handle 22 of the rod 21 and disengages the same from the notch 26 and moves said rod 21 rearward into the rail 14, thus withdrawing its outer end from the socket plate 28 in the post 7, and then swings the entire gate or barrier into the position shown by dotted lines A, Fig. 1, thus permitting the passenger to pass through the door opening between the posts 7 and 8. If desired, the gate or barrier can be locked in this position by shifting the rod 21 outward so that its outer end engages in the socket plate 28 seated in the post 8, and the swinging movement of the gate or barrier in both directions is limited by the stop lugs 12, against which the depending lug 20 engages, and thus the correct position of the gate is insured and the outer end of the rod 21 can be readily engaged in the socket plates in the posts 7 and 8.

While the gate or barrier is in the position shown by solid lines in Fig. 1, the passengers leaving the car are free to pass from the door opening out through the space between the door post 8 and the rail 30, and thus in no wise interfere with the movements of the passengers getting on the car.

The conductor, stationed on the center of the car platform, is in position to manipulate the gate or barrier to correspond to the movements of the passengers, and having full view of the car platform and of the movements of the passengers entering or getting off the car, can readily and properly signal the motorman or car driver.

When a platform of my improved car is to be occupied by the motorman, the rail 30 and post 34 are swung into the position shown by dotted lines B, Fig. 1, and the rail 36 is moved outward to its limit of movement, thus bringing the ball 38 into the socket 39, and the rail being located in this position by engaging the handle 37 in the notch 33, and the gate or barrier is swung forward into the position shown by dotted lines C, Fig. 1, and the rod 21 is moved outward until its outer end engages in the socket plate 28 seated in the post 4, and said rod is locked in this position by engaging the handle 22 in the notch 25. Thus a space is provided for the motorman or car driver, and a clear space is provided for the movements of passengers entering or getting off this end of the car.

A car of my improved construction is very simple and inexpensive, provides means for the collection of the fares of the passengers entering the car, does away with crowding and confusion of the passengers at the entrance door of the car, and permits the conductor to remain at a fixed station on the car platform.

I claim:

1. The combination with a street car and the platform thereof, of a stanchion arranged on the car platform in front of the door opening in the end of the car body, and a barrier arranged to swing on the stanchion, the free side of which barrier is adapted to swing from one side of the door opening to the other.

2. The combination with a street car and the platform thereof, of a stanchion arranged on the car platform in front of the door opening in the end of the car body, a barrier arranged to swing on the stanchion, the free side of which barrier is adapted to swing from one side of the door opening to the other, and means arranged on the barrier for locking the same after movement.

3. The combination with a street car and the platform thereof, of a stanchion arranged on the car platform in front of the door opening in the end of the car body, a barrier arranged to swing on the stanchion, the free side of which barrier is adapted to swing from one side of the door opening to the other, a rail connected to the stanchion and projecting toward the step at the side of the car platform, and a post supporting the outer end of said rail.

4. The combination with a street car and the platform thereof, of a stanchion arranged on the car platform in front of the door opening in the end of the car body, a barrier arranged to swing on the stanchion, the free side of which barrier is adapted to swing from one side of the door opening to the other, means arranged on the barrier for locking the same after movement, a rail connected to the stanchion and projecting toward the step at the side of the car platform, and a post supporting the outer end of said rail.

5. The combination with a street car and the platform thereof, of a stanchion arranged on the car platform in front of the door opening in the end of the car body, a barrier arranged to swing on the stanchion, the free side of which barrier is adapted to swing from one side of the door opening to the other, and means whereby the swing of the barrier in both directions is limited.

6. The combination with a street car and the platform thereof, of a stanchion arranged on the car platform in front of the door opening in the end of the car body, a barrier arranged to swing on the stanchion, the free side of which barrier is adapted to swing from one side of the door opening to the other, means whereby the swing of the barrier in both directions is limited, and means arranged on the barrier for locking the same after movement.

7. An attachment for street cars comprising a stanchion arranged on the car platform in front of the door in the end of the car body, a barrier arranged to swing on the lower portion of the stanchion, and a transversely disposed rail arranged between the step on the side of the car platform and the stanchion.

8. The combination with a street car and the platform thereof, of a stanchion arranged on the car platform in front of the door opening in the end of the car body, a barrier arranged to swing on the stanchion, the free side of which barrier is adapted to swing from one side of the door opening to the other, a rail connected to the stanchion and projecting toward the step at the side of the car platform, a post supporting the outer end of said rail, and sliding rods carried by said rail and the upper portion of the barrier.

9. A car having two compartments in communication with each other and one of which is provided with a side opening, and movable barriers located in the compartment provided with the side opening; said movable barriers being adapted to be positioned to provide a partial inclosure in the compartment in which they are located extending from a point intermediate of the ends of the opening providing communication between the compartments to a point intermediate of the ends of said side opening, and being also adapted to be moved into a position in proximity to an end wall of the compartment in which they are located farthest removed from the other compartment to provide an inclosure between themselves and said end wall, substantially as set forth.

10. A car having two compartments in communication with each other and one of which is provided with a side opening a post centrally located in said compartment provided with a side opening, and movable barriers supported by said post; one of said barriers being adapted to extend to a point intermediate of the ends of the opening between said compartments, and the other barrier being adapted to extend to a point intermediate of said side opening, substantially as set forth.

In testimony whereof, I have signed my name to this specification, in presence of two subscribing witnesses.

CHARLES O. BIRNEY.

Witnesses:
M. P. SMITH,
E. M. HARRINGTON.